Nov. 23, 1965     H. SCHWAB     3,219,360
MULTIPLE-AXLE VEHICLE

Filed Oct. 25, 1963     3 Sheets-Sheet 1

INVENTOR.
Hans Schwab
BY
Woodhams Blanchard & Flynn

Nov. 23, 1965   H. SCHWAB   3,219,360
MULTIPLE-AXLE VEHICLE
Filed Oct. 25, 1963   3 Sheets-Sheet 3

INVENTOR.
Hans Schwab
BY
Woodhams Blanchard & Flynn

3,219,360
MULTIPLE-AXLE VEHICLE
Hans Schwab, Pfaffenhofen, near Neu-Ulm, Germany, assignor to Firma Karl Kassbohrer Fahrzeugwerke G.m.b.H., Ulm, Germany, a corporation of Germany
Filed Oct. 25, 1963, Ser. No. 318,975
Claims priority, application Germany, Oct. 26, 1962, K 48,072
4 Claims. (Cl. 280—104.5)

This invention relates to a multiple-axle vehicle having an axle group consisting of at least three vehicle axles, with the vehicle axles being supported by two leaf spring sets, both sets being of the same construction. The spring sets lie along the lateral sides of a vehicle frame, and each is mounted unsymmetrically on a spring support. The short ends of the spring sets are connected to the outer axles, while their long ends, which extend toward each other, are joined to a plate which is connected with the middle axle.

The main advantage of this arrangement consists of the fact that a uniform distribution of the axle load is effected.

According to a prior art proposal, the plate connected with the middle axle is constructed as a two-armed lever and the long ends of the leaf spring sets are each connected directly with one of the lever arms.

It is the purpose of this invention to improve the maneuverability of the multiple-axle vehicle. The invention accomplishes this by introducing between the long end of one spring set and the plate a directing device with is connected swivelly on the one hand with the spring set end and on the other hand with the plate.

By connecting the long end of one spring set with the plate by means of a directing device, as aforesaid, the maximum swinging capability especially of the center axle, but also of the two outer axles, is considerably increased. This results in a considerable improvement of the maneuverability of the vehicle.

The drawings show one preferred embodiment of the invention for illustrative purposes.

Figure 1:
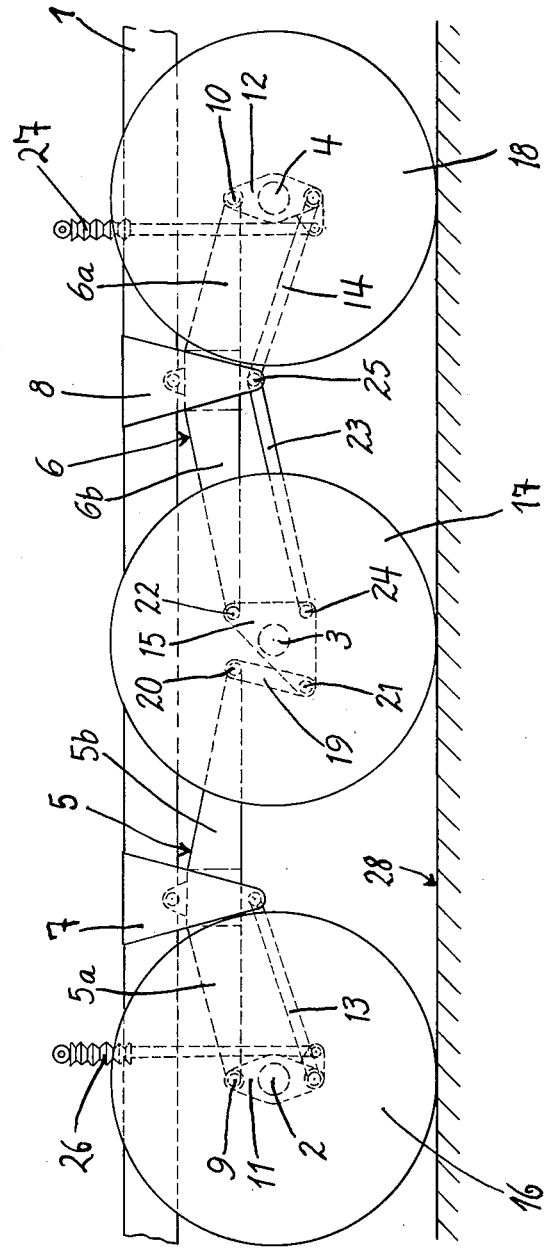
FIGURE 1 is a somewhat schematic side view of the axle group of the multiple-axle vehicle according to the present invention on level ground.

FIGURE 1 shows a vehicle frame 1 having on each lateral side thereof an axle group consisting of the three axles 2, 3 and 4. The axles 2, 3 and 4 are connected by means of two leaf spring sets 5 and 6 which are of the same construction and which are located one behind the other. The leaf spring sets 5 and 6 are connected unsymmetrically to identical spring supports 7 and 8 which in turn are attached to vehicle frame 1. The short ends 5a and 6a, respectively, of the leaf spring sets 5 and 6 are pivotally connected by means of the joint bolts or pins 9 and 10 with the upper ends of the double levers 11 and 12. The levers 11 and 12 are attached rigidly to the outer axles 2 and 4 in an upright position. This position is maintained by the push bars 13 and 14, which at one end are pivotally connected to the lower ends of the levers 11 and 12 and at their other ends are pivotally connected to the spring supports 7 and 8. The long ends 5b and 6b, respectively, of the leaf spring sets, which ends face each other, are joined to a plate 15 which is connected with the middle axle 3. Wheels 16, 17 and 18 are mounted in a familiar manner on the axles 2, 3 and 4.

According to the invention, a directing device 19 is connected between the long end 5b of leaf spring set 5 and the plate 15 is connected to the middle axle 3. The directing device 19 on the one hand is connected swivelly with spring set end 5b by means of a joint bolt 20, and on the other hand is connected with plate 15 by means of a joint bolt 21. Desirably, the bolt 21, with regard to axle 3, lies essentially opposite joint bolt 22 by which the long end 6b of spring set 6 is joined to the plate 15.

In order to keep the plate 15 in a stable position, it is suitably supported by a push bar 23 against the vehicle frame 1. Push bar 23 is joined at one end to plate 15 at 24. This connection is made on the opposite side of the axle 3 from directing device 19 and is substantially directly below the bolt 22. At its other end the push bar 23 is pivotally connected to the spring support 8 for leaf spring set 6 at 25 by means of a joint bolt. Suitably, push bar 23 together with long end 6b of leaf spring set 6 forms a parallel linkage system which holds the plate 15 in an upright position when middle axle 3 is swung out with respect to support 8.

The vibrations of the axles are absorbed by shock absorbers 26 and 27 which are attached to the double levers 11 and 12.

Figure 2:
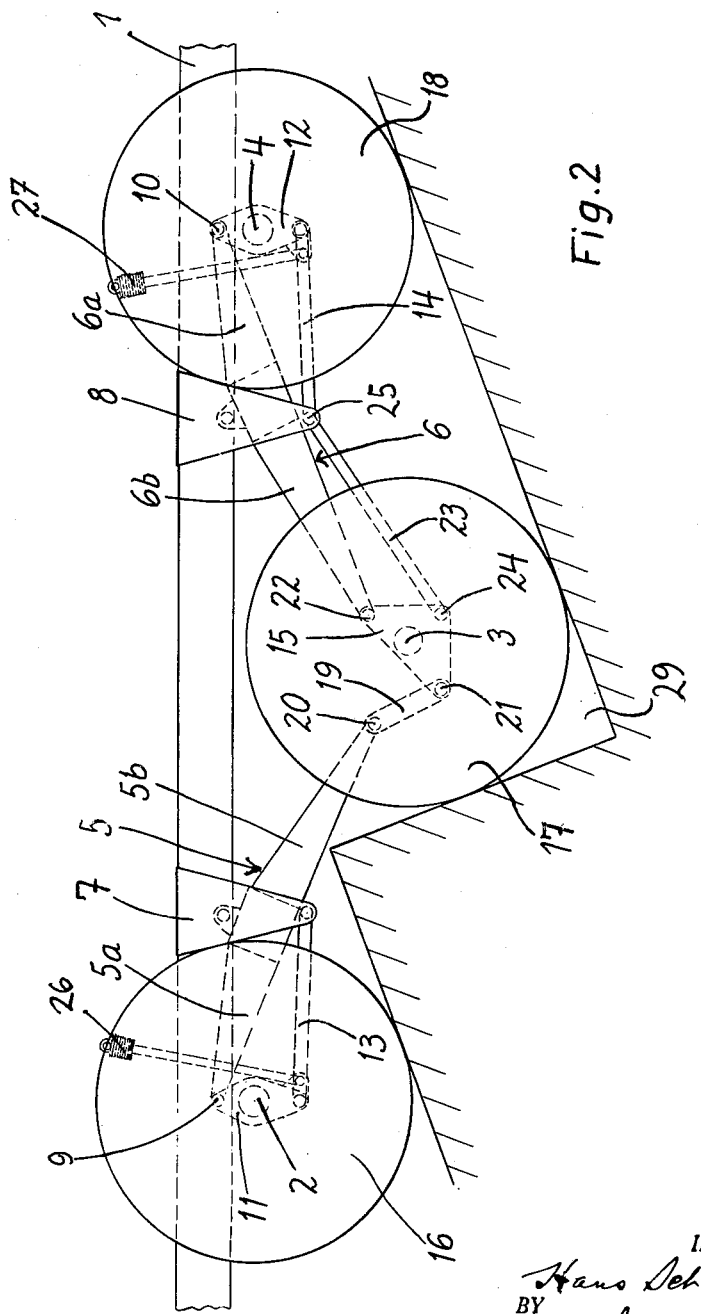
FIGURE 2 is a view similar to FIGURE 1 showing the condition of the axle group when driving over a ground indentation.
Figure 3:
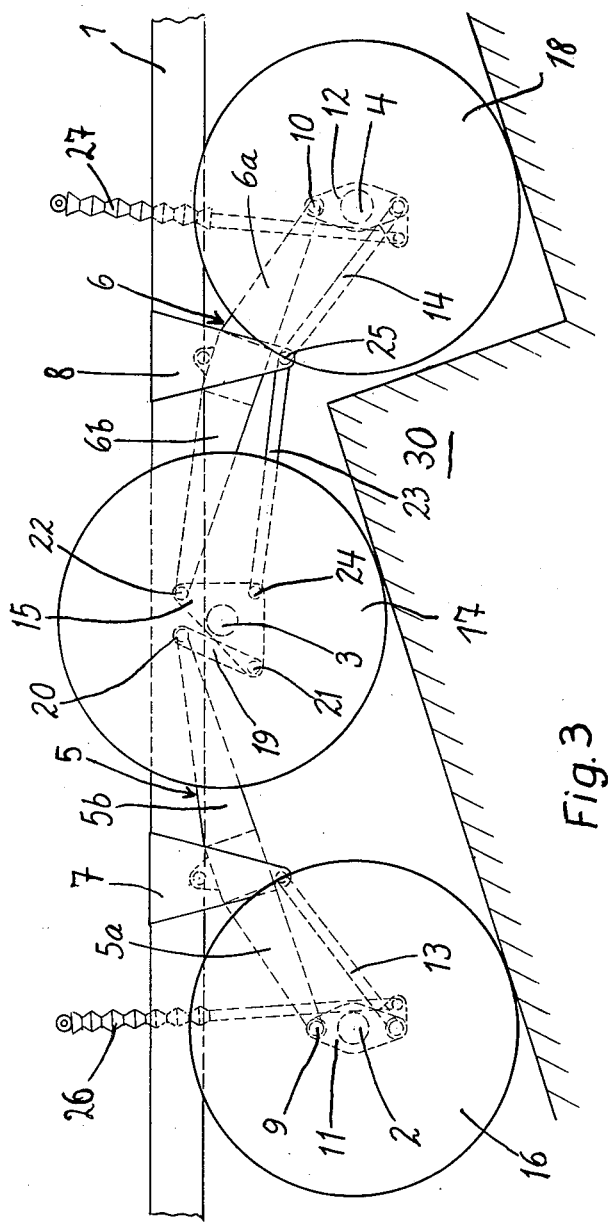
FIGURE 3 is a view similar to FIGURE 1 showing the condition of the axle group when driving over a rise in the ground.

FIGURE 1 shows the multiple-axle groups 2, 3 and 4 of the multiple-axle vehicle according to the present invention when it travels over level ground 28. FIGURE 2 shows the same axle group when the middle wheel 17 is in a depression 29 of the ground profile. FIGURE 3 shows the behavior of the axle group when travelling over elevation 30. A comparison of FIGURES 1, 2 and 3 shows that through the connection of the long end 5b of spring set 5 with plate 15 by means of the intermediate directing device 19 the axle 3 can swing a considerable distance with respect to the other axle, as can the outer axles 2 and 4, so that the multiple-axle vehicle can move without difficulty even on very uneven ground.

The spring set 6 and push bar 23 hold the plate 15 in an upright position so that the axle 3 moves in unison with the frame 1 in all positions of the axle 3. However, the directing device 19 provides a large freedom of movement, in a vertical direction, of the axle 3 with respect to the axles 2 and 4.

The directing device 19 makes it possible for the middle axle 3 to swing a greater vertical distance, both upwardly and downwardly, with respect to the axles 2 and 4 than is the case with the prior art proposal referred to above. At the same time, the connections between the axles 3 and 4 provided by the spring set 6 and the push bar 23 provide positive guidance for the axle 3 in a simple, inexpensive and reliable manner.

Although a particular embodiment of the invention has been described above in detail for illustrative purposes, it will be recognized that variations or modifications of such disclosure, which lies within the scope of the appended claims, are fully contemplated.

What is claimed is:
1. In a multiple-axle vehicle, the combination comprising:
  a vehicle frame;
  an axle group consisting of at least three adjacent vehicle axles;
  two leaf spring sets of the same construction, each set spanning the gap between an end one of said axles and the center axle;
  spring supports mounted on said vehicle frame and connected to each spring set at a point longitudinally offset from the center thereof, the short ends of the spring sets being connected to the respective end axles;
  a bracket connected to the center axle;

the long end of one of said spring sets being directly connected to the upper end of said bracket;

a push bar pivotally connected at one end to a point fixed with respect to the vehicle frame and pivotally connected at the other end thereof to the lower end of said bracket;

a directing device pivotally connected at one end to the lower end of said bracket, the long end of the other spring set being pivotally connected to the other end of said directing device:

the connections of said one spring set said push bar and said directing device to said bracket lying at the corners of a triangle with said one spring set being connected at the apex and said push rod and directing device being respectively connected to the opposite ends of the base of the triangle.

2. A multiple-axle vehicle according to claim 1, in which the directing device is connected to said bracket at a point on the opposite side of the axis of the center axle from the point at which the long end of said one of said spring sets is connected to said bracket.

3. A multiple-axle vehicle according to claim 1, in which said push bar is connected at one end thereof to said bracket at a point on the opposite side of the axis of said center axle from the point at which said directing device is connected to said bracket.

4. A multiple-axle mechanism according to claim 3, in which said push bar is substantially parallel with the longitudinal extent of the long end of said one spring set.

References Cited by the Examiner

UNITED STATES PATENTS 2,821,408  1/1958  Schwab _____ 280—104.5

FOREIGN PATENTS 520,672  3/1931  Germany.
419,475  11/1934  Great Britain.

A. HARRY LEVY, *Primary Examiner.*

MILTON BUCHLER, *Examiner.*